(12) United States Patent
Jones

(10) Patent No.: US 7,757,837 B2
(45) Date of Patent: Jul. 20, 2010

(54) ROTARY PRODUCT ACCUMULATOR

(75) Inventor: Arthur K. Jones, Wading River, NY (US)

(73) Assignee: Curran Manufacturing Corporation, Hauppauge, NY (US)

(*) Notice: Subject to any disclaimer, the term of this patent is extended or adjusted under 35 U.S.C. 154(b) by 319 days.

(21) Appl. No.: 11/850,924

(22) Filed: Sep. 6, 2007

(65) Prior Publication Data

US 2008/0053280 A1    Mar. 6, 2008

Related U.S. Application Data

(60) Provisional application No. 60/842,501, filed on Sep. 6, 2006.

(51) Int. Cl.
*B65G 47/26* (2006.01)

(52) U.S. Cl. ............ 198/778; 198/347.1; 198/392

(58) Field of Classification Search ............ 198/778, 198/392, 347.1–347.3
See application file for complete search history.

(56) References Cited

U.S. PATENT DOCUMENTS

| | | | | |
|---|---|---|---|---|
| 740,981 | A * | 10/1903 | Jennings | 99/366 |
| 774,177 | A * | 11/1904 | Hopkins | 62/381 |
| 1,393,288 | A * | 10/1921 | Hutton | 99/352 |
| 2,814,399 | A * | 11/1957 | McIlhenny et al. | 414/290 |
| 2,873,020 | A * | 2/1959 | Kay | 198/347.1 |
| 2,911,345 | A * | 11/1959 | Swenson | 204/201 |
| 2,918,729 | A * | 12/1959 | Rayner | 34/184 |
| 3,318,439 | A * | 5/1967 | Sullivan | 198/347.1 |
| 3,640,373 | A * | 2/1972 | Seragnoli | 198/392 |
| 4,254,859 | A * | 3/1981 | Basso | 198/443 |
| 4,519,494 | A | 5/1985 | McEvoy et al. | |
| 5,190,195 | A | 3/1993 | Fullhart et al. | |
| 5,234,098 | A * | 8/1993 | Pedersen | 198/533 |
| 5,400,894 | A | 3/1995 | Smith | |
| 5,699,894 | A | 12/1997 | Bestgen et al. | |
| 6,311,825 | B1 * | 11/2001 | Schmitt | 198/392 |

(Continued)

FOREIGN PATENT DOCUMENTS

JP            60128110 A *  7/1985  ............... 198/778

OTHER PUBLICATIONS

Model PCA Light Duty Portable Parts Conveyor, Internet Page—published Dec. 23, 2004 (Hytrol Conveyor Co., Inc.), [retrieved Jan. 25, 2008 via <URL:http://web.archive.org/web/20041223140634/www.cisco-eagle.com/systems/conveyors; conveyor-cutsheets/pca.pdf>.

*Primary Examiner*—Mark A Deuble
(74) *Attorney, Agent, or Firm*—Fish & Richardson P.C.

(57) ABSTRACT

A stand-alone parts accumulator that can be retrofit as a unitary add-on to an existing production line. The parts accumulator includes: (a) a generally linear conveyor; (b) a rotary table comprising a spiral barrier guide defining a path from an outer region of the table to an inner region of the table; (c) a connector attaching the linear conveyor to the rotary table; (d) a motor connected to rotate the rotary table; (e) an adjustable controller connected to the motor to control rotation of the table. A single bracket can be used to support the conveyor in either a left-hand or a right-hand configuration. The conveyor motor is positioned substantially within the footprint of the conveyor. The conveyor is narrow (between about 2 inches and about 8 inches).

8 Claims, 5 Drawing Sheets

U.S. PATENT DOCUMENTS 6,466,828 B1 10/2002 Lem et al.
6,793,068 B2 * 9/2004 Shefet et al. ................ 198/778
2002/0060145 A1 5/2002 Doerfer et al.

* cited by examiner

ROTARY PRODUCT ACCUMULATOR

CROSS-REFERENCE TO RELATED APPLICATIONS

This application claims priority to U.S. Application Ser. No. 60/842,501, filed on Sep. 6, 2006.

TECHNICAL FIELD

This invention is in the general field of production lines, particularly apparatus that catches and stores parts on such lines.

BACKGROUND

Parts catchers or parts accumulators collect parts from production lines. Typically the parts are finished parts produced by feeding raw material, such as material in bar form, to a lathe. The lathe machines the raw material, shaping and cutting off a complete, or near complete part, which is then stored in the parts catcher. Often the parts catcher is simply a bucket on some type of movable arm that can extend at the proper time via the machine control so as to catch the work piece to be stored. After receiving the part from the lathe, the parts catcher retracts and deposits the work piece through an opening in the machine guarding either into a collection box on the front of the machine, or onto a straight conveyor, typically 3-4 feet in length. Then the machine can continue making the next piece.

Some parts catchers have very limited storage space, and hence they provide only a short amount of unmanned runtime, and/or they present a strong possibility of damaging the finished parts as they bang together. Such limitations presented by the parts catcher undermine one of the significant advantages of bar feeding—extended periods of unmanned run time.

Parts accumulators can be large and the space they occupy can interfere with efficiency.

SUMMARY

The invention generally features a stand-alone parts accumulator that can be retrofit as a unitary add-on to an existing production line. The parts accumulator includes: (a) a generally linear conveyor; (b) a rotary table comprising a spiral barrier guide defining a path from an outer region of the table to an inner region of the table; (c) a connector attaching the linear conveyor to the rotary table; (d) a motor connected to rotate the rotary table; (e) an adjustable controller connected to the motor to control rotation of the table.

Preferred embodiments may include other features. For example, the controller may be independently powered. A second motor may be connected to more the generally linear conveyor. A weir (e.g., a stationary bar extending over the table with arms extending from the bar into the path) may be positioned to meter movements of parts toward the center of the path. A bracket supports the generally linear conveyor to attach it to the rotary table.

A second aspect of the invention, which can be combined with the first aspect or employed independently, features a reversible bracket mounting the conveyor. The same bracket can be used for either left-hand or right-hand installations, and there is no need to disassemble (reconfigure) the drive when switching between left hand and right hand drive; nor is there any need to reconfigure the drive or to reverse the motor when switching between left hand and right hand drive. The bracket is positioned substantially within the periphery of the conveyor, so it does not obstruct access to the conveyor when the conveyor is not being used. When combined with the above-described rotary accumulator, the assembly presents a compact package.

A third aspect of the invention, which also can be used alone or combined with any one or more of the other aspects, features positioning the conveyor motor within the "footprint" of the conveyor, meaning that the motor does not increase the effective width of the overall device. The advantages of this include:

a) better weight balance, reducing the degree of support required for the conveyor and therefore the complexity of the conveyor mounting;

b) improved belt life by use of a belt drive that pulls the belt rather than pushing it;

c) improved ability to use the conveyor in tight spaces, by removal of obstructions from the working end of the conveyor; and d) improved access to machine components such as foot pedals and oil fill points.

The invention thus permits the use of a separate motor to drive the conveyor without a substantial sacrifice of convenience or access to the conveyor, and without substantially increasing the footprint of the entire assembly.

In a fourth aspect of the invention, which also can be combined with either or both of the first two aspects, the conveyor width is between about 2" and 8". Preferably, the amount of dead space on each side is 1 inch or less. This feature also makes access to the machine easier.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
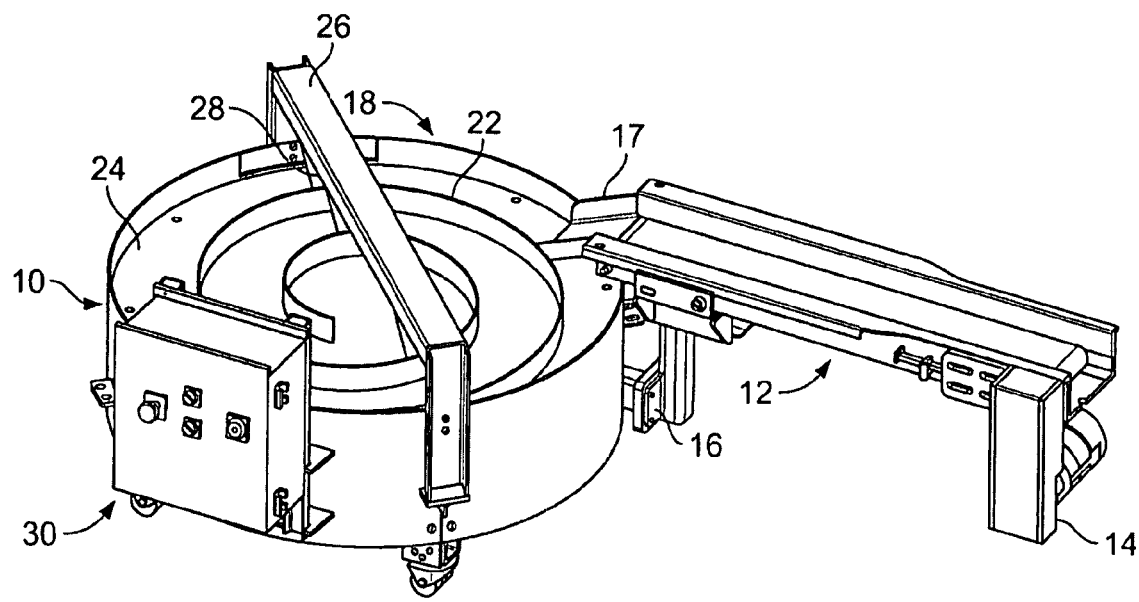
FIG. 1 is a perspective view of a rotary (spiral) accumulator according to the invention.
Figure 2:
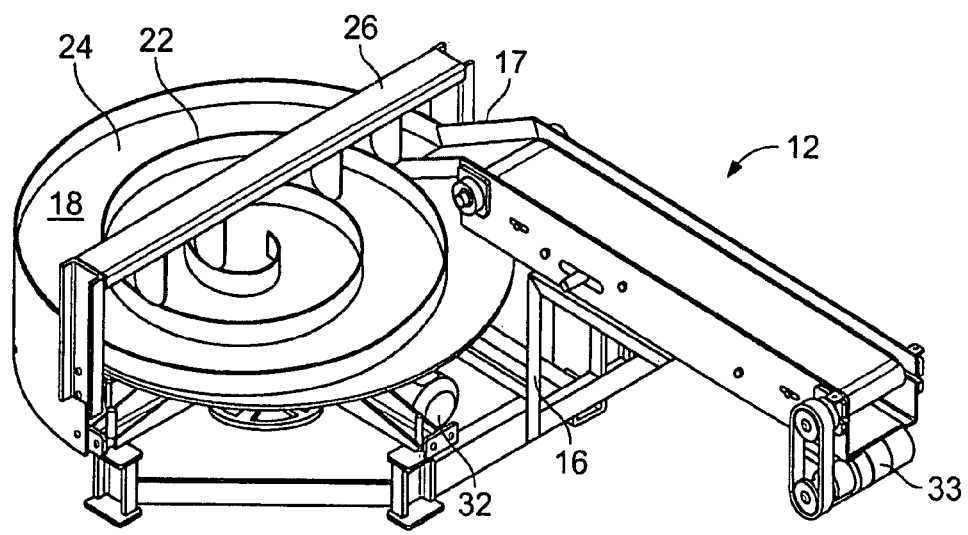
FIG. 2 is a perspective view of a rotary (spiral) accumulator with sections cut away to show additional features.

In FIG. 1, rotary accumulator 10 includes a linear conveyor 12, supported at the front end by stand 14. At the other end, the conveyor is attached by bracket 16 to a rotary table 18. A ramp 17 provides a connecting path for parts to travel from conveyor 12 onto table 18.

Table 18 includes a spiral wall 22 forming a path 24 on the top of rotary table 18 in which parts can accumulate in a relatively compact area. Weir 26 includes triangular arms 28 extending downwardly into path 24 to control the movement of parts along path 24.

A controller 30 includes a connection for power and electronic controls for motor 32 which is connected to rotate table 18. The electronic controls manually control the speed at which table 18 rotates. Controller 30 also controls motor 33 which drives linear conveyor 12 so that the speed of conveyor 12 matches the speed at which table 18 rotates. An adjustable timer in controller 30 is set to match the machine tools cycle time. Conveyor 12 is an integral part or the accumulator 10, simplifying the installation of the accumulator onto the production line.

In operation, a production line (e.g. having a lathe), deposits parts on linear conveyor 12. Driven by motor 33, conveyor 12 moves the parts to ramp 17 and then onto table 18. The speed of rotation of table 18 and the speed of conveyor 12 are controlled by controller 30, so that parts are accumulated in the spiral path on table 18 at a desired rate. The weir 26 is stationary. As table 18 rotates, arms 28 contact the parts and move them toward the center of the spiral in an orderly way, with the parts added earlier being located at the center of the spiral and the later added parts being located at the periphery. When the path is loaded with parts, accumulator 10 is emptied for the next machine tool cycle.

As noted, there are advantages to driving the product accumulator with a motor that is separate from the conveyor motor. For example the stand-alone accumulator with its own motor can be more easily attached and detached.

Figure 3:
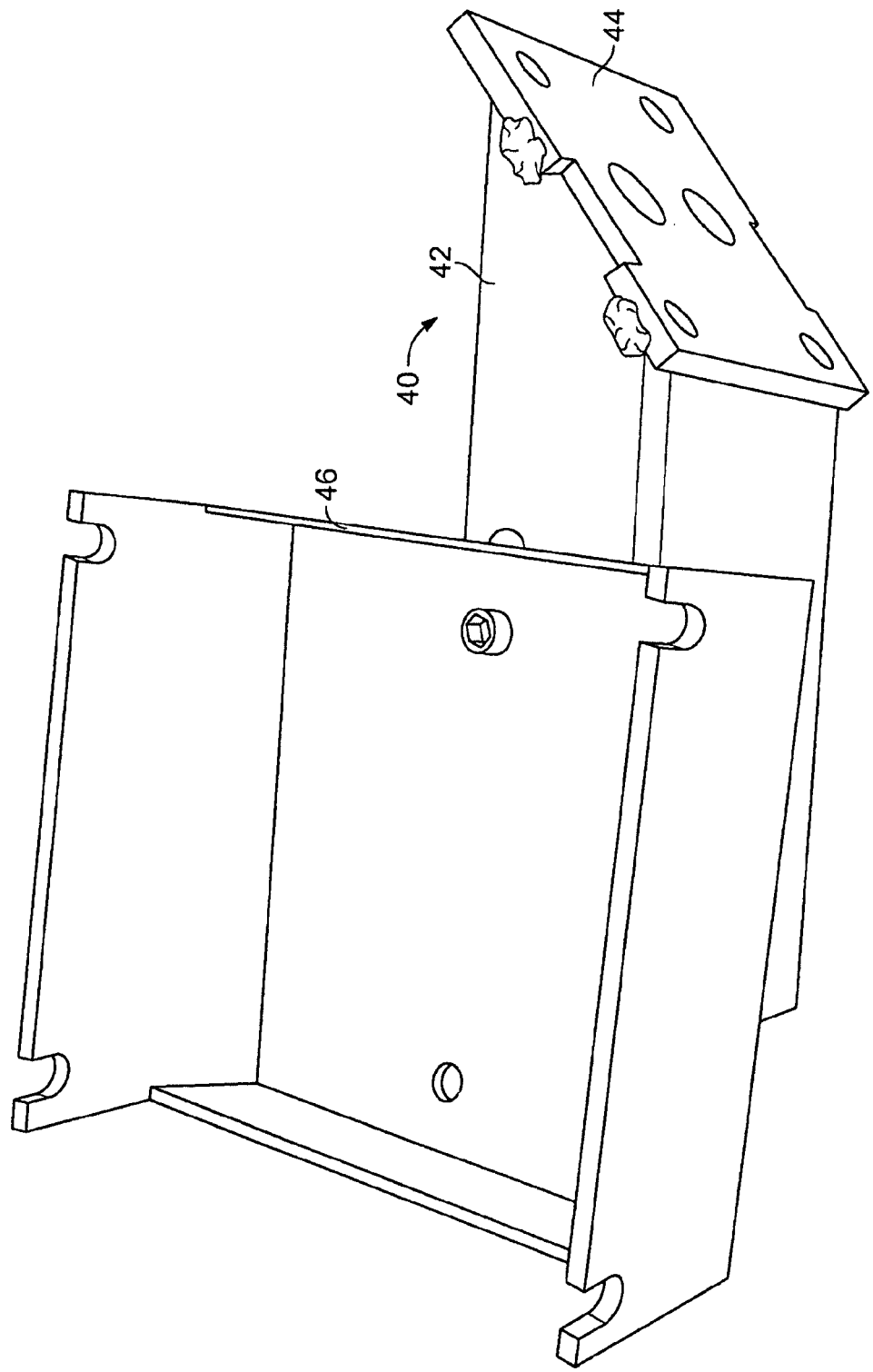
FIGS. 3 and 4 respectively are views of the same conveyor mounting bracket, showing that it can be used in both left- and right-hand configurations.
Figure 4:
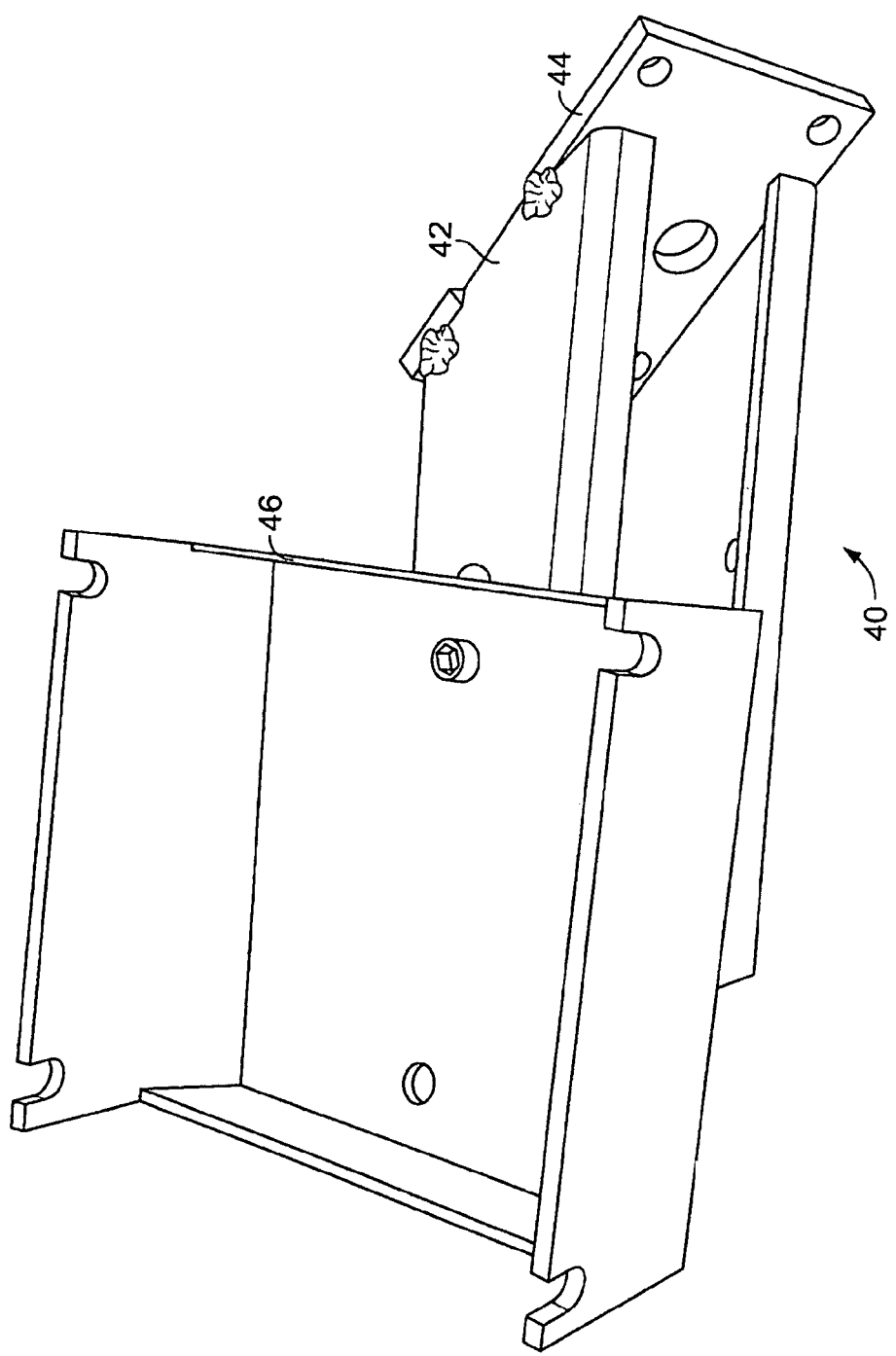

FIGS. 3 and 4 show a conveyor-mounting bracket having 40 three parts: a support 42 connecting a slanted plate 44 to a conveyor mounting cradle 46. The same parts are used in both FIGS. 3 and 4. The only difference between the figures is that cradle 46 has been moved from one side to the other. In that way, the bracket holds the conveyor either in a left-hand configuration (FIG. 3) or a right-hand configuration (FIG. 4). To switch between these configurations, it is only necessary to remove bolts holding the cradle 46 to support 42 and to then move the cradle to the other side of support 42.

Figure 5:
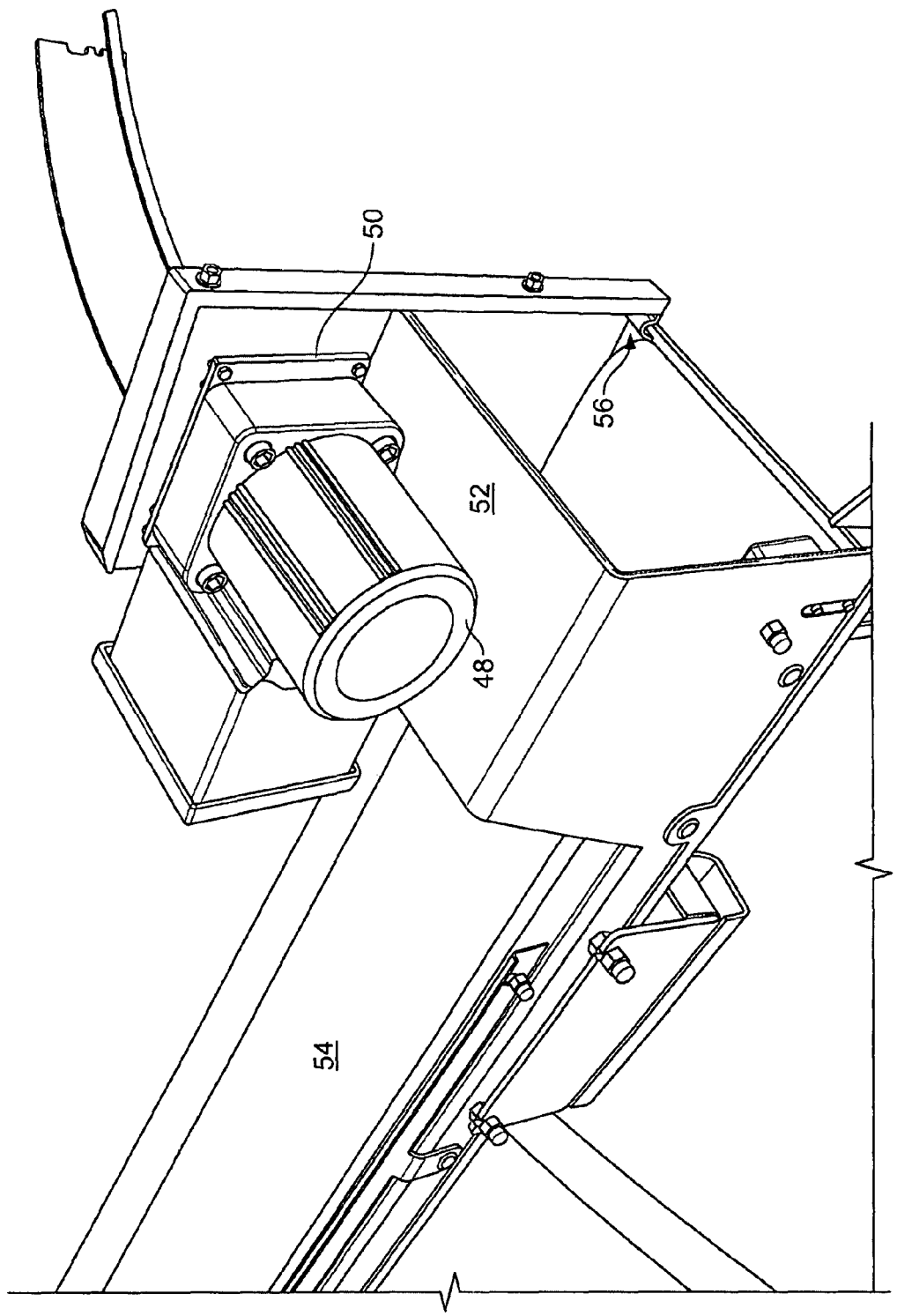
FIG. 5 is a view of a motor mounted for operation with a conveyor belt

In FIG. 5, motor 48 is mounted to a plate 50 attached to a bridge 52 over the conveyor 54. Motor 48 does not extend beyond the footprint of conveyor 54, so it does not expand the footprint of the conveyor/motor assembly. The accumulator is not shown.

Figure 6:
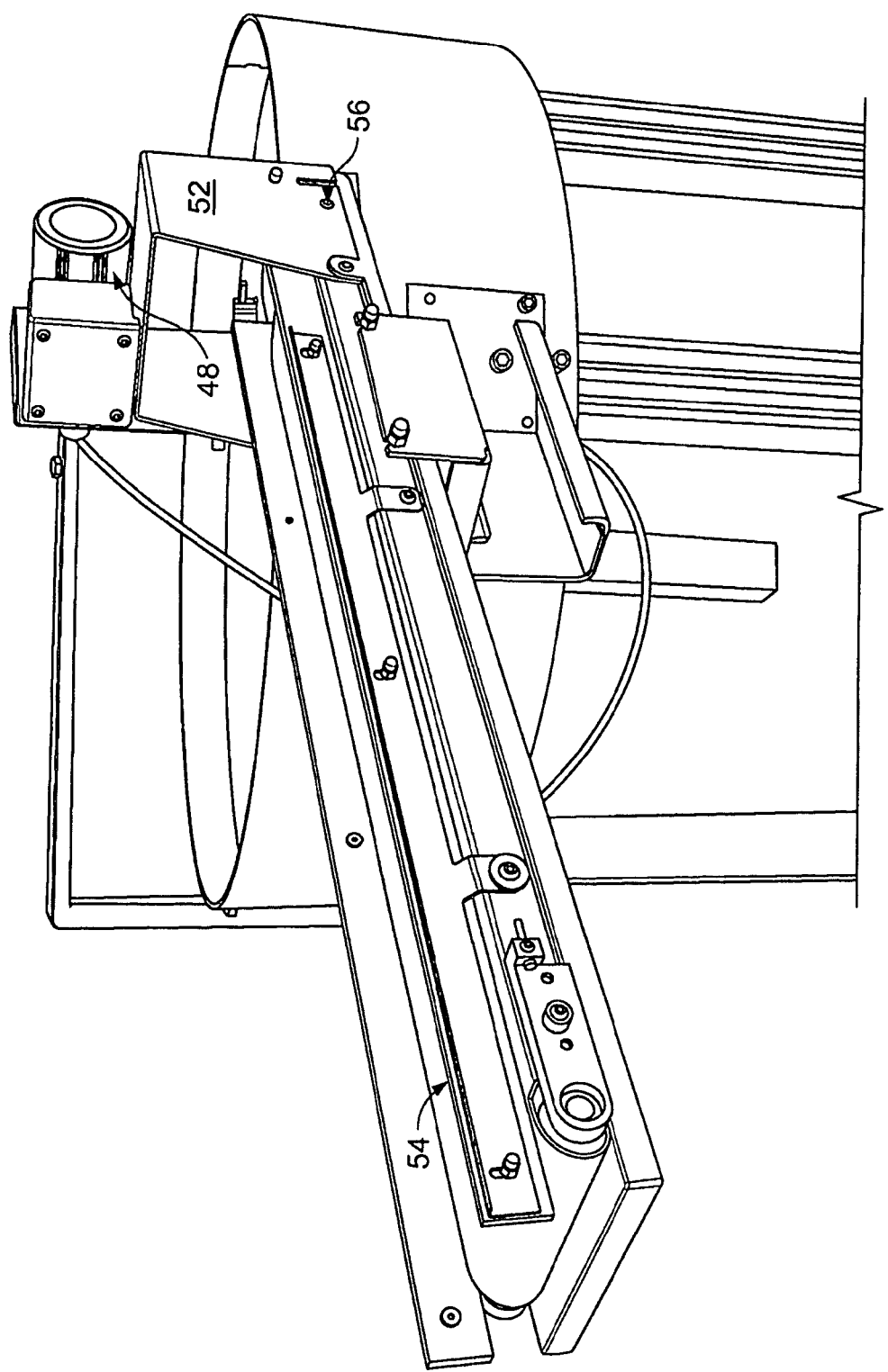
FIG. 6 is a view of the conveyor belt and motor assembled with the product accumulator.

FIG. 6 is a view of the entire assembly: the conveyor; the motor and controller; and the accumulator. The overall width of the conveyor is relatively narrow and its footprint is not substantially increased by the motor, enabling the operator to have easy access to the conveyor and motor. Even with the parts accumulator added, access to critical areas around the assembly are generally unobstructed.

Drive roller 56 is inboard (past) motor 48. As a result, the motor pulls the conveyor rather than pushes it, which is generally a more efficient design as it reduces the tendency for the conveyor belt to buckle when parts of significant weight are being conveyed. The invention achieves this design while remaining compact.

A number of embodiments of the invention have been described. Nevertheless, it will be understood that various modifications may be made without departing from the spirit and scope of the invention.

What is claimed is:

1. A stand-alone unitary parts accumulator/conveyor assembly comprising
   (a) a generally linear conveyor delivering parts to a rotary accumulator table;
   (b) the rotary accumulator table comprising a spiral barrier guide defining a path from an outer region of the table to an inner region of the table, the path being accessible for removal of parts accumulated on the table;
   (c) a connector attaching the linear conveyor to the rotary table;
   (d) a motor connected to rotate the rotary table;
   (e) an adjustable controller connected to the motor to control rotation of the table; said controller including a adjustable control to match rotary table rotation with part-cycle delivery; and
   (f) a reversible bracket mounting the conveyor to the parts accumulator in position where the conveyor is offset from a table radius, the bracket comprising:
      (1) a plate for mounting the bracket to the parts accumulator;
      (2) an support attached to the plate at a slant, the support including a first surface and a second surface generally opposite and spaced from the first surface; and
      (3) a conveyor cradle attached to either the first support surface or the second support surface,
   wherein the first surface includes a first feature sized and shaped to cooperate with a fastener to position the cradle in a first position, parallel to, and facing away from, the first surface, and the second surface includes a second feature sized and shaped to cooperate with a fastener to position the cradle in a second position, parallel to, and facing away from, the second surface, whereby the cradle may be fastened either to the first surface in the first position or to the second surface in the second position.

2. The parts accumulator/conveyor assembly of claim 1 in which the controller is independently powered.

3. The parts accumulator/conveyor assembly of claim 1 further comprising a second motor connected to more the generally linear conveyor.

4. The parts accumulator/conveyor assembly of claim 1 comprising a bracket supporting the generally linear conveyor.

5. The parts accumulator/conveyor assembly of claim 1 in which the conveyor is between 2" and 8" wide.

6. The parts accumulator conveyor assembly of claim 1 in which the parts accumulator comprises a rotary table comprising a spiral barrier guide defining a path from an outer region of the table to an inner region of the table; and the accumulator comprises,
   (a) a motor connected to rotate the rotary table;
   (b) an adjustable controller connected to the motor to control rotation of the table.

7. The parts accumulator conveyor assembly of claim 1 in which the conveyor has a width of between 2 inches and 8 inches.

8. The parts/accumulator conveyor assembly of claim 1 further comprising a motor mounted to drive the conveyor, the motor being positioned substantially within the footprint of the conveyor.

* * * * *